(12) United States Patent
Zhang et al.

(10) Patent No.: US 11,241,851 B2
(45) Date of Patent: Feb. 8, 2022

(54) COMPOSITE STIFFENER

(71) Applicant: AIRBUS OPERATIONS LIMITED, Bristol (GB)

(72) Inventors: Junwei Zhang, Bristol (GB); Martin Gaitonde, Bristol (GB); Joshua Bonaventura, Bristol (GB); John Norman Woolcock, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/798,860

(22) Filed: Feb. 24, 2020

(65) Prior Publication Data
US 2020/0276780 A1 Sep. 3, 2020

(30) Foreign Application Priority Data
Mar. 1, 2019 (GB) ..................................... 1902778

(51) Int. Cl.
*B32B 5/02* (2006.01)
*B29D 99/00* (2010.01)
(Continued)

(52) U.S. Cl.
CPC .......... *B29D 99/0003* (2013.01); *B29B 11/16* (2013.01); *B29C 70/462* (2013.01);
(Continued)

(58) Field of Classification Search
CPC ..... B32B 7/03; B32B 5/024; B32B 2262/106; B64C 3/20; B64C 3/182; B64C 3/26;
(Continued)

(56) References Cited

U.S. PATENT DOCUMENTS 8,746,618 B2 6/2014 Brook et al.
2010/0239865 A1* 9/2010 Kallinen ............ B29D 99/0014
428/411.1
(Continued)

FOREIGN PATENT DOCUMENTS

EP 1 547 756 6/2005
EP 2 636 593 9/2013
(Continued)

OTHER PUBLICATIONS

Extended European Search Report for European Patent Application No. 20159196.3, nine pages, dated Jul. 23, 2020.
(Continued)

*Primary Examiner* — Donald J Loney
(74) *Attorney, Agent, or Firm* — Nixon & Vanderhye P.C.

(57) ABSTRACT

A composite stiffener for a stiffener reinforced panel is disclosed. The stiffener has a longitudinal direction and a run-out region which terminates at an end of the stiffener. The stiffener also has a constant section region inboard of the run-out region in the longitudinal direction and having a constant cross section transverse to the longitudinal direction with a crown between adjacent foot portions. The run-out region has a changing cross section transverse to the longitudinal direction with a crown between adjacent foot
(Continued)

portions and the crown reduces in height towards the end of the stiffener forming a ramp. The composite stiffener includes a number of blankets of non-crimp fabric layers.

17 Claims, 5 Drawing Sheets (51) Int. Cl.
*B32B 7/03* (2019.01)
*B29B 11/16* (2006.01)
*B29C 70/46* (2006.01)
*B29L 31/30* (2006.01)

(52) U.S. Cl.
CPC .......... *B29D 99/0014* (2013.01); *B32B 5/024* (2013.01); *B32B 7/03* (2019.01); *B29D 99/001* (2013.01); *B29L 2031/3085* (2013.01); *B32B 2262/106* (2013.01)

(58) Field of Classification Search
CPC ................ B64C 3/185; B29D 99/0003; B29D 99/0014; B29D 9/001; B29B 11/16; B29C 70/462; B29C 70/085; B29C 70/48
See application file for complete search history.

(56) References Cited

U.S. PATENT DOCUMENTS

| 2011/0156309 A1 | 6/2011 | Lonsdorfer et al. |
| 2012/0052247 A1 | 3/2012 | Pook et al. |

FOREIGN PATENT DOCUMENTS

| EP | 2 746 038 | 6/2014 |
| EP | 3 002 355 | 4/2016 |
| WO | 2012/102789 | 8/2012 |
| WO | 2015/158865 | 10/2015 |
| WO | 2015/187867 | 12/2015 |
| WO | 2018055647 A1 | 3/2018 |
| WO | 2018055647 A8 | 3/2018 |

OTHER PUBLICATIONS

Combined Search and Examination Report for GB Application No. 1902778.8 dated Aug. 27, 2019, 9 pages.
Search and Examination Report for GB Application No. 1902778.8 dated Jan. 30, 2020, 6 pages.

* cited by examiner

COMPOSITE STIFFENER

CROSS RELATED APPLICATION

This application claims priority to United Kingdom (GB) Patent Application 1902778.8 filed Mar. 1, 2019, the entire contents of which is hereby incorporated by reference.

FIELD OF THE INVENTION

The present invention relates to a composite stiffener for a stiffener reinforced panel, and a method of manufacturing a stiffener.

BACKGROUND OF THE INVENTION

Stiffeners are often attached to or integral with a panel to provide reinforcement to the panel. For example, stringers are elongated stiffening members that may be attached to a skin or cover of an aircraft wing and extend in a generally spanwise direction. The same basic layout is found in the vertical and horizontal stabilizers. A similar structure is also found in an aircraft fuselage, where the stiffeners extend in the longitudinal aircraft direction. The stiffeners provide the necessary reinforcement to withstand the aerodynamic and structural loads experienced by the aircraft during flight and whilst on the ground.

In areas where the stringers terminate, the cross section of the stringer changes in order to facilitate the load transfer from the stringer to the panel. The height of the stringer (perpendicular to the plane of the panel) is typically decreased towards the termination, known as a run out region.

Stringer runouts can result in areas of complex geometry for the manufacture of composite stringers. Manufacturing issues, such as wrinkling, can occur in these regions of complex geometry. Different fibre layer materials may be more or less suitable in these regions due to their different drapeability. Wrinkles and other manufacturing defects, such as voids and fibre misalignments, have the potential to provide localised stress points and therefore reduce the overall performance of the stringer. Simplifying the manufacturing process to minimise cutting of the fibre layers and cutting of the cured composite stringer to define the geometry reduces the cost and time to manufacture.

SUMMARY OF THE INVENTION

A first aspect of the invention provides a composite stiffener for a stiffener reinforced panel, wherein the stiffener has a longitudinal direction and a run-out region which terminates at an end of the stiffener, and a constant section region inboard of the run-out region in the longitudinal direction and having a constant cross section transverse to the longitudinal direction with a crown between adjacent foot portions, wherein the run-out region has a changing cross section transverse to the longitudinal direction with a crown between adjacent foot portions and the crown reduces in height towards the end of the stiffener forming a ramp, and the composite stiffener comprises a plurality of blankets of non-crimp fabric layers.

The stringer with a crown between adjacent foot portions may be known as an 'omega', or 'top hat', or 'bowler hat' shaped stringer, for example. A web may extend between each foot portion and the crown. The fabric layers may run continuously from the lateral edge of one foot portion and up through one web to the crown and down though the other web to the lateral edge of the foot on the other side of the crown.

Non-crimp fabrics (NCF) are typically provided as blankets' comprising two, or possibly more, fibre layers. Each fibre layer may be unidirectional. The fibre layers are joined together, e.g. by stitching, to form the blanket. The fibre layers in a blanket typically have different fibre orientations. A blanket comprising two fibre layers of different unidirectional fibre orientations is known as a biaxial NCF. Triaxial and quadraxial fabrics are also available.

NCF blankets are advantageous in that they enable a faster layup because the multiple fabric layers in the blankets are stitched together so they can be laid down as one. However NCF blankets suffer the problem that they can have relatively poor drapeability, compared to woven or unidirectional fabrics for example, due to the different fibre orientations of the layers in the blanket and the stitching between the layers. The fewer the number of layers in the blanket the better the drapeability, so a biaxial NCF blanket may be preferred for draping performance NCF blankets with a 0 degree fibre layer aligned with the stiffener longitudinal direction provide excellent load carrying performance in the primary load direction.

The particular geometry of the run out region of an omega shaped stiffener with a ramp in the crown of the stiffener in the run out region presents a challenge to the use of NCF material in the stiffener. The inventors have found ways to achieve cost effective manufacturing using NCF material in the stiffener without having to resort to cutting the fibre material of the stiffener once laid up prior to resin infusion.

In a first example, the stiffener includes both NCF blankets and woven fibre layers with the NCF blankets being dropped off leaving only the woven fibre layers in the more difficult to form run out region. The woven fibre layers provide several advantages in that they provide better drapeability and there are no 0 degree fibre layers in the run out region which provides better stress performance.

The run-out region may comprise one or more woven fabric layers.

The one or more woven fabric layers may extend from a top of the ramp to a bottom of the ramp.

The composite stiffener may further comprise a transition region between the constant section region and the run-out region. The constant section region may have a plurality of blankets of non-crimp fabric layers sandwiched between woven fabric layers. At least one of the blankets of non-crimp fabric layers may be dropped off in the transition region. The woven fibre layers also provide good damage tolerance. It is therefore advantageous to provide the woven fibre layers as the outer layers (top and bottom) of the layup.

All of the blankets of non-crimp fabric layers in the constant section region may be dropped off in the transition region.

The run-out region may include the woven fabric layers and no non-crimp fabric blankets.

In a second example, the stiffener includes NCF blankets, at least one of which extends to the end of the stiffener and which is cut to form darts so that the NCF blankets can be draped to form to the shape of the run out region. The use of only NCF blankets in the layup provides economies but at the expense of additional time to form the darts.

The run-out region may include one or more of the non-crimp fabric blankets. The blanket may have a dart cut out and overlap itself in the run-out region.

The run-out region may have a ramped portion including the ramp, and a substantially planar toe portion between the ramp and the end of the stiffener.

Each of the blankets of non-crimp fabric layers may include a first layer having a 0 degree fibre orientation aligned with the stiffener longitudinal direction and a second layer having a fibre orientation not aligned with the stiffener longitudinal direction.

The constant section region may have an omega section.

The constant section region may have a cross section with continuous layers extending through the crown and the adjacent foot portions.

The stiffener may comprise carbon fibre composite material.

A further aspect of the invention provides an aircraft structure including a panel reinforced with a stringer which is a stiffener according to the first aspect.

A further aspect of the invention provides a method of manufacturing a stiffener, comprising laying up a plurality of blankets of non-crimp fabric layers and a plurality of woven fabric layers as dry fabrics on a mould tool and co-infusing the dry fabrics with resin followed by co-curing to form the stiffener. The stiffener may be in accordance with the first aspect.

The method may comprise laying up a plurality of blankets of non-crimp fabric layers sandwiched between woven fabric layers in the constant section region, and cutting at least one of the blankets of non-crimp fabric layers so that the blanket is dropped off in the transition region.

The method may further comprise cutting all of the blankets of non-crimp fabric layers so that all of the blankets are dropped off in the transition region.

The run-out region may include the woven fabric layers and no non-crimp fabric blankets.

The method may further comprise laying up the plurality of woven fabric layers on a portion of the mould tool to define the shape of the ramp in the run-out region followed by the co-curing step without an intermediate step of cutting the woven fabric layers laid up on the mould tool.

BRIEF DESCRIPTION OF THE DRAWINGS

Embodiments of the invention will now be described with reference to the accompanying drawings, in which.

DETAILED DESCRIPTION

Figure 1:
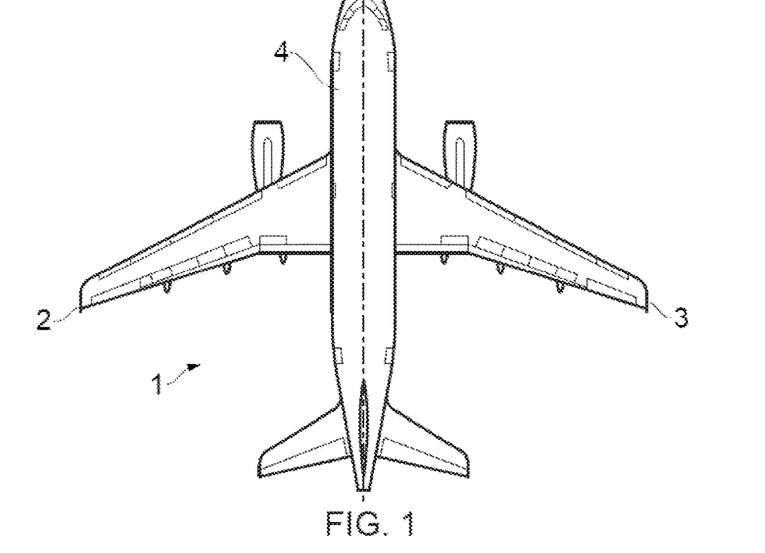
FIG. 1 is a plan view of an aircraft.

FIG. 1 shows an aircraft 1 with port and starboard wings 2, 3. Each wing has a cantilevered structure with a length extending in a span-wise direction from a root to a tip, the root being joined to an aircraft fuselage 4. The wings 2, 3 are similar in construction so that only the starboard wing 3 will be described in detail with reference to FIGS. 2 and 3. The aircraft 1 shown is a conventional transonic jet passenger transport aircraft, but it will be appreciated that this description can relate to a wide variety of aircraft including military, civilian, general aviation, jet, prop, high wing, low wing, etc.

Figure 2:
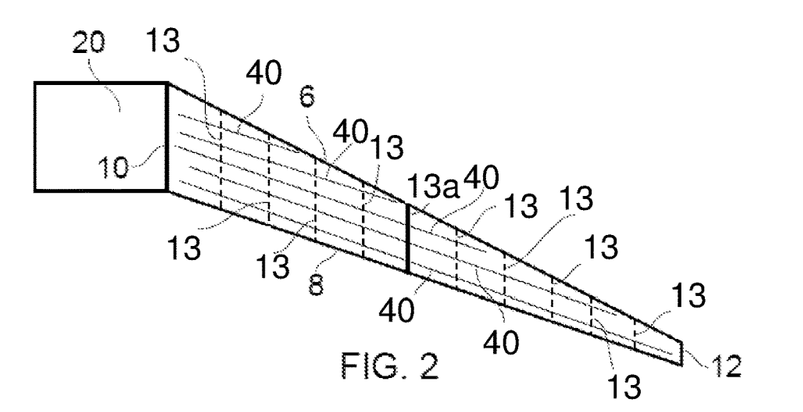
FIG. 2 is a schematic plan view of an aircraft wing box.
Figure 3:
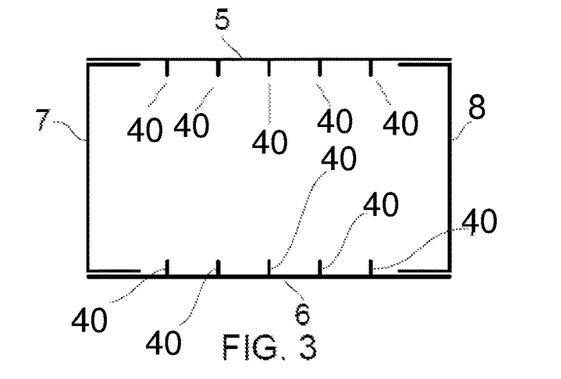
FIG. 3 is a schematic section view of an aircraft wing box.

The main structural element of the wing is a wing box formed by upper and lower covers 5, 6 and front and rear spars 7, 8 shown in cross section in FIG. 3. The covers 5, 6 and spars 7, 8 are each carbon fibre reinforced polymer (CFRP) laminate components. Each cover has an aerodynamic surface (the upper surface of the upper cover 5 and the lower surface of the lower cover 6) over which air flows during flight of the aircraft. Each cover also has an inner surface carrying 'stringers' or stiffeners. Each cover carries of the order of 30 to 40 stiffeners, so for the purposes of clarity only 5 are shown in FIG. 2. The stringers are labelled 40.

As shown in FIG. 3, each spar has a C-shaped cross section with upper and lower spar flanges each joined to the inner surface of a respective one of the covers 5, 6 and a spar web extending between the spar flanges. One or more of the covers 5, 6 may be integrated with the spars 7, 8 to form an omega or 'u' or 'n' shaped wing box component.

The wing box also has a plurality of transverse ribs 13, each rib being joined to the covers 5, 6 and the spars 7, 8. The ribs include an inboard rib 10 located at the root of the wing box, and a number of further ribs 13 spaced apart from the innermost rib along the length of the wing box. The wing has a large number of such ribs 13 and for the purposes of clarity only 10 are shown in FIG. 2.

The wing boxes may be divided into a plurality of fuel tanks, such as an inboard fuel tank bounded by the inboard rib 10, a mid-span rib 13a indicated in solid line, the covers 5, 6 and the spars 7, 8; and an outboard fuel tank bounded by the mid-span rib 13a, an outboard rib 12 at the tip of the wing box, the covers 5, 6 and the spars 7, 8.

The inboard rib 10 is an attachment rib which forms the root of the wing box and is joined to a centre wing box 20 within the body of the fuselage 4. As can be seen in FIG. 2, the stiffeners 40 stop short of the inboard rib 10 and the outboard rib 12, but pass through the ribs 13.

Figure 4:
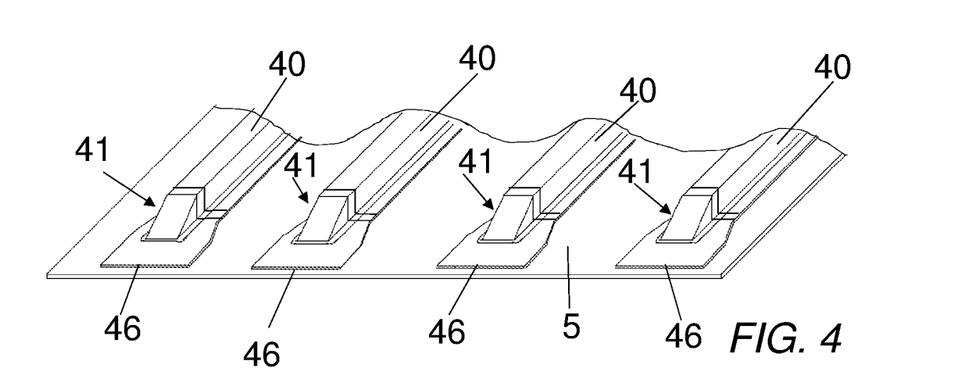
FIG. 4 is a cut away view of a stringer reinforced panel.

FIG. 4 shows a schematic cut-away view of the stringers 40 attached to the upper-wing cover 5, and in particular show the area in which the stringers 40 terminate. The stringers have a longitudinal direction generally aligned with the wing's span-wise direction and an "Omega" cross-sectional shape. The stringers 40 have a generally constant cross section transverse to the longitudinal direction, and a run-out region 41 which terminates at an end of the stringer 40.

Figure 5:
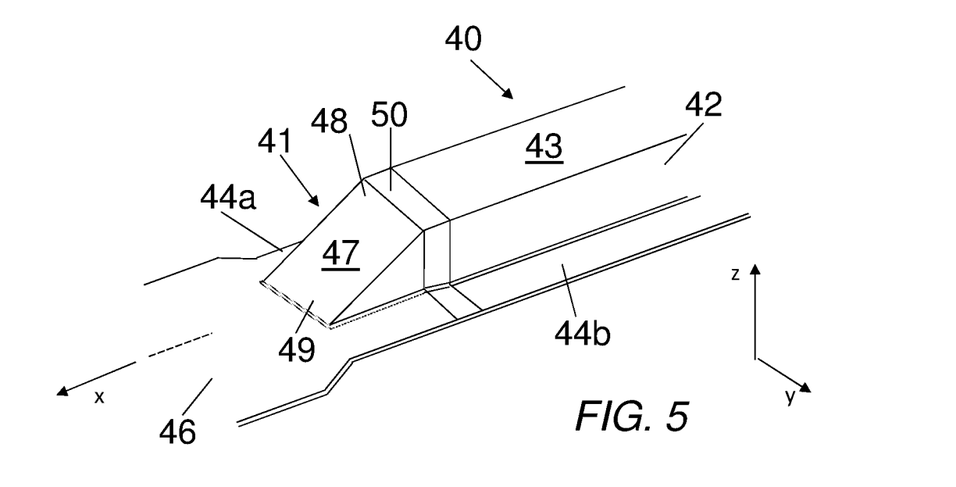
FIG. 5 is a three dimensional view of a stringer (stiffener)
Figure 6:
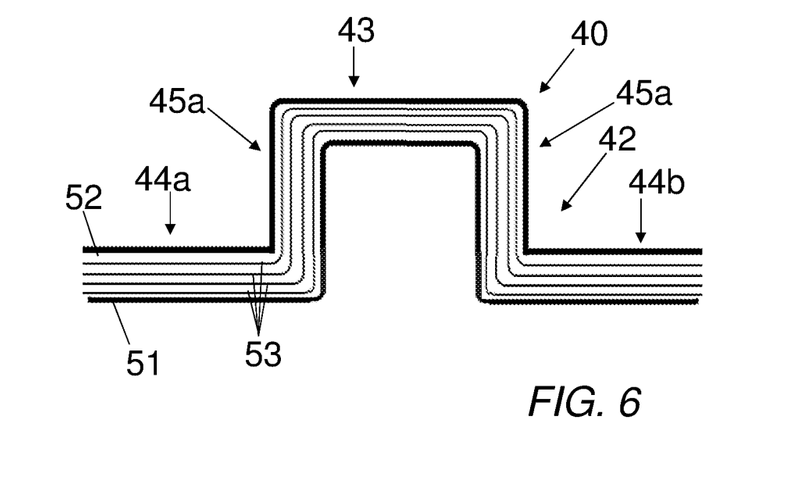
FIG. 6 is a transverse section view through the constant section region of the stringer.
Figure 7:
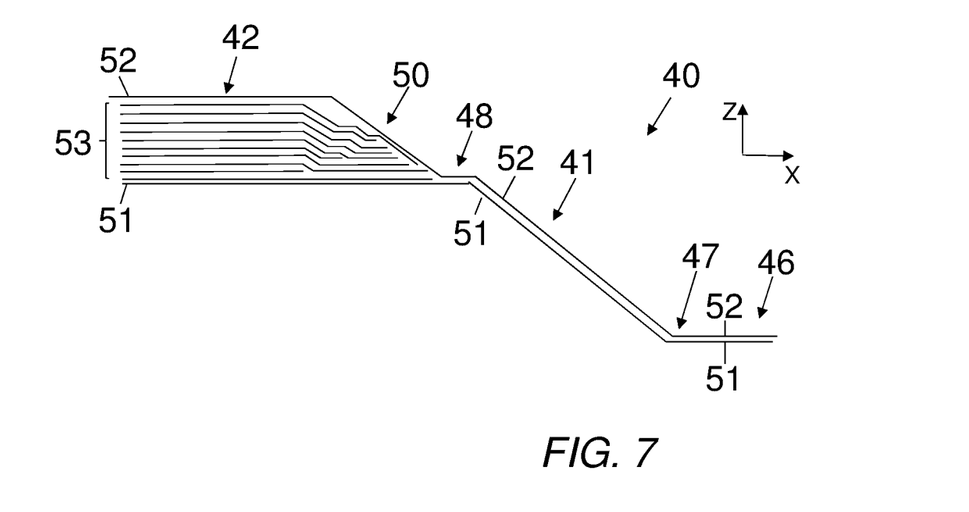
FIG. 7 is a longitudinal section view through the stringer showing the constant section region, the run out region and the transition region.

The stringer 40 is shown in more detail with reference to FIGS. 5 to 7. The constant section region 42 of the stringer 40 lies inboard (i.e. away from) the run-out region 41 in the longitudinal direction, x. The constant section region 42 has the constant cross section transverse to the longitudinal direction, x, with a crown 43 between adjacent foot portions 44a, 44b. The crown is joined to the foot portions 44a, 44b by respective webs 45a, 45b. The webs 45a, 45b are generally upstanding, z, perpendicular to the plane, x-y, of the upper-wing cover 5 and therefore generally parallel in the longitudinal direction, x, in the constant section region 42 of the stringer 40.

The run-out region 41 has a changing cross section transverse to the longitudinal direction, x, also with a crown 43 between the adjacent foot portions 44, a, 44b. In the run-out region 41 the crown 43 reduces in height towards the toe portion 46 at the end of the stiffener 40 forming a ramp 47. The run out region 41 has a similar basic "omega" shape as the inboard constant section region 42 but the height of the crown 43 above the foot portions 44a, 44b decreases substantially linearly from a top 48 of the ramp to a bottom 49 of the ramp. Between the top 48 of the ramp and the constant section region 42 there is a transition region 50 which will be described in more detail with reference to FIG. 7.

Turning first to FIG. 6, which shows a cross section through the constant section region 42 it can be seen that the stiffener comprises a laminate stack of fibre layers comprising a lowermost woven fabric layer 51, an uppermost woven fabric layer 52 and a plurality of blankets 53 of non-crimp fabric (NCF) layers between the lowermost woven fabric layer 51 and the uppermost woven fabric layer 52.

FIG. 7 shows a cross section through the stiffener 40 in the xz plane along the central longitudinal axis, x, of the stiffener 40. In the constant section region 42 the plurality of blankets 53 of non-crimp fabric layers can be seen sandwiched between the woven fabric layers 51, 52. The woven fabric layers 51, 52 are continuous through the constant section region 42, the transition region 50, the run-out region 41 and the toe portion 46. In the transition region 50 the blankets 53 of non-crimp fabric layers are terminated. Preferably, the blankets 53 of non-crimp fabric layers are terminated in a staggered fashion along the longitudinal direction, x. The height of the stack of blankets 53 of non-crimp fabric layers therefore reduces towards the end of the stiffener forming a taper in the crown 43, the webs 45a, 45b and the foot portions 44a, 44b towards the end of the stringer. In the transition region 50 all of the blankets 53 of non-crimp fabric layers are terminated leaving only the woven fabric layers 51, 52 at the top 48 of the ramp 47 in the run-out region 41.

Figure 8:
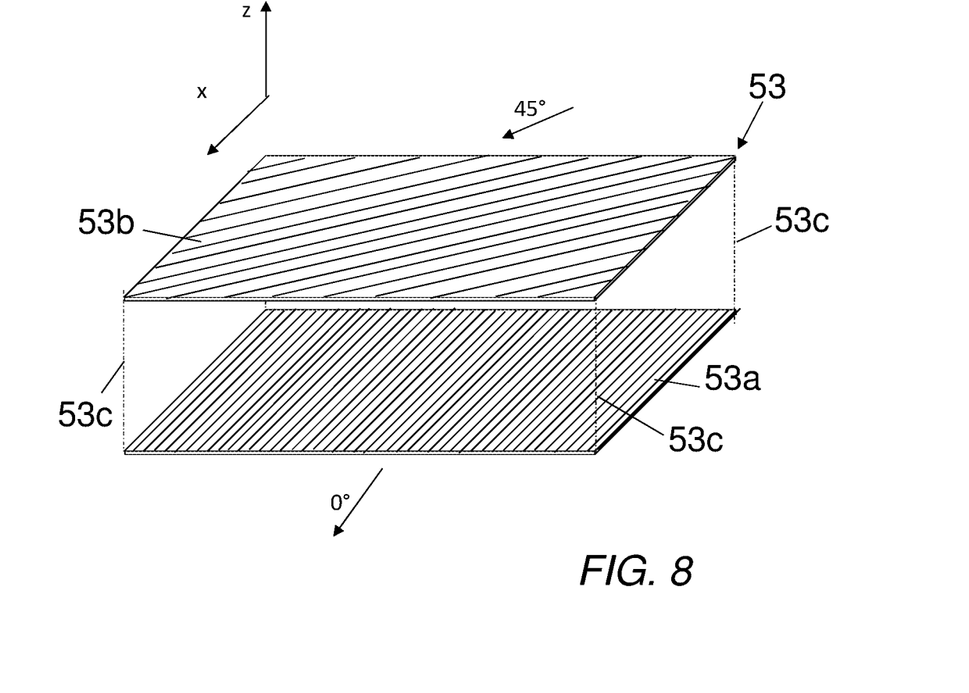
FIG. 8 is a schematic view of an NCF biaxial blanket.

FIG. 8 shows an exploded view of one of the non-crimp fabric blankets 53 and which comprises a first layer 53a having a 0° fibre orientation, and a second layer 53b having a 45° fibre orientation. The first and second layers 53a, 53b are joined together, e.g. by stitching, as generally indicated by the broken lines 53c. In this example, the 0° fibre orientation is aligned with the longitudinal axis, x, of the stiffener 40.

In the constant section region 42 of the stiffener 40, having a plurality of layers having a 0° fibre orientation may be advantageous to provide longitudinal bending stiffness for the stiffener 40. However, in the run-out region 41 this bending stiffness is generally undesirable as the purpose of the run-out region 41 is to provide flexibility to transition the stiffener load into the panel to which it is attached, e.g. the upper or lower wing covers 5, 6.

Figure 9:
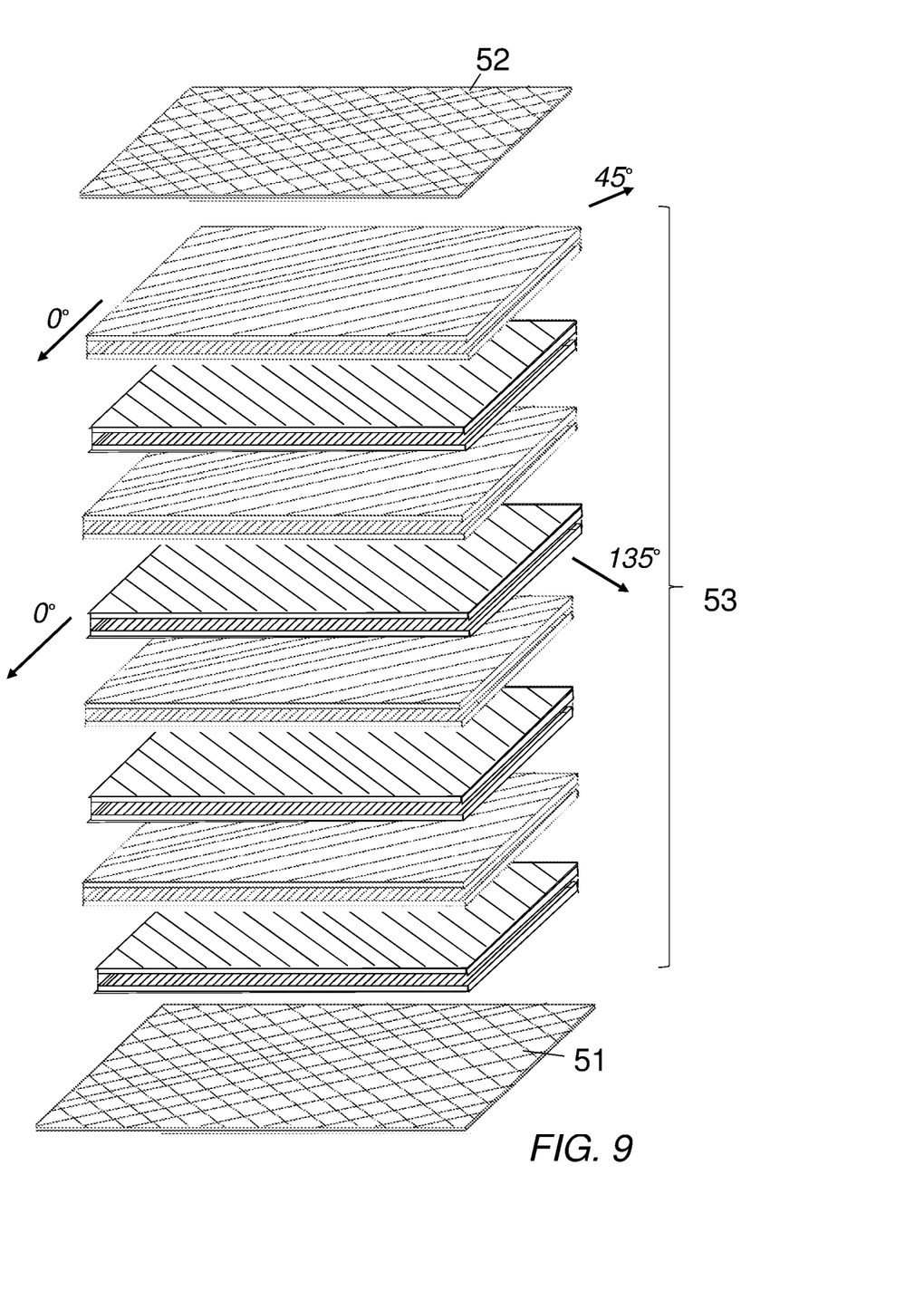
FIG. 9 is a schematic view of the stringer layup with NCF blankets sandwiched between woven fibre layers.

The plurality of blankets 53 of non-crimp fabric layers may be arranged in a stack to achieve a generally balanced layup. To that end, some of the blankets 53 may comprise biaxial NCF blankets having 0/45 fibre orientations, and others of the blankets 53 of NCF fabrics may have 0/135 fibre orientations. In a preferred embodiment the number of biaxial 0/45 NCF blankets equals the number of 0/135 NCF blankets. The different NCF blankets having 0/45 and 0/135 fibre orientations may be alternated through the stack and with a mirror layup either side of a mid-plane through the stack of NCF blankets 53.

By terminating the NCF blankets 53 in the transition region 50 so as to leave only the woven fabric layers 51, 52 in the run-out region 41, the stress performance in the run-out region of the stiffener can be optimised. As well, the woven fabric layers 51, 52 typically will have better drape performance than the NCF blankets 53 and so can form to the complex shape of the run-out region 41 without requiring any darting of the woven fabric layers 51, 52. The woven fabric may be, e.g. a 5 harness fabric although any other suitable woven fabric may be used. The good drape performance and lack of requirement for darting of the woven fibre fabric layers 51, 52 helps to improve manufacturability and also the quality of the final composite stiffener 40.

Figure 10:
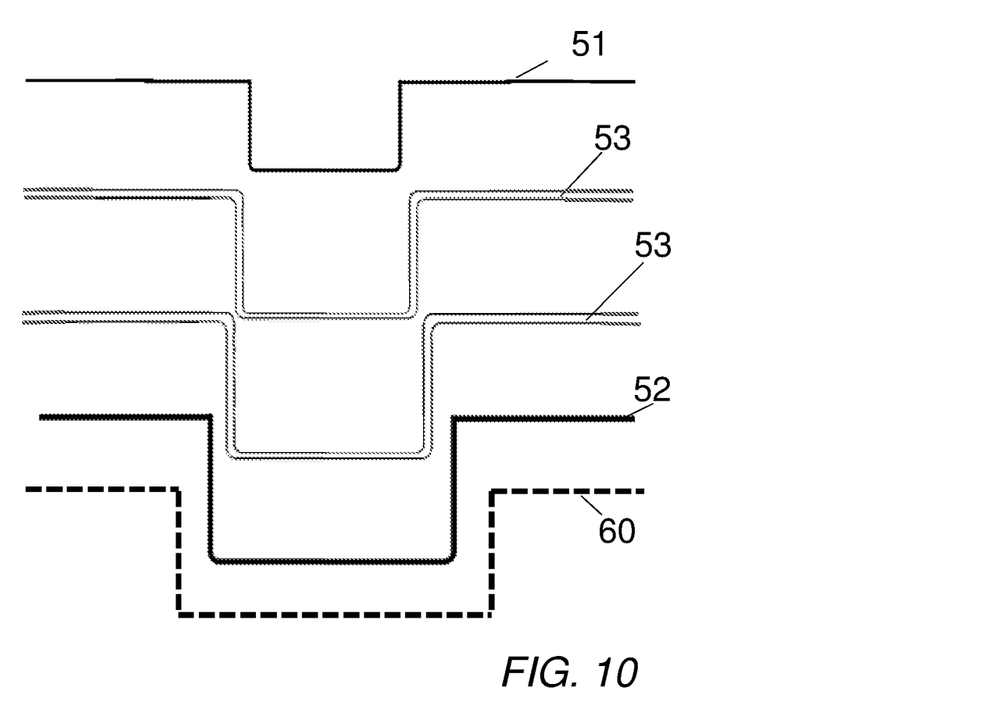
FIG. 10 is a section view of the layup being laid up on a mould tool.

FIG. 10 illustrates schematically a method of manufacturing the stiffener 40, in which the layers of dry or semi-preg carbon fibre material are laid upon a mould tool 60. The uppermost woven fibre fabric layer 52 is laid first on the mould tool 60 followed by the plurality of NCF blankets 53 and finally the lowermost woven fibre fabric layer 51. The dry or semi-preg layers are then infused with a suitable resin and cured in a conventional manner Once cured the stiffener 40 can be removed from the mould tool 60.

The mould tool 60 has a shape conforming to the outer-mould surface of the completed stiffener 40, including the transition region 50 and the run-out region 41, such that after curing the completed stiffener 40 may be removed from the mould tool 60 without the need for any cutting or machining of the fibre fabric layers either during the layup on the mould tool, or after removing the cured composite stiffener 40 from the mould tool 60. By avoiding these cutting steps the manufacturability of the stiffener 40 is significantly improved.

Figure 11:
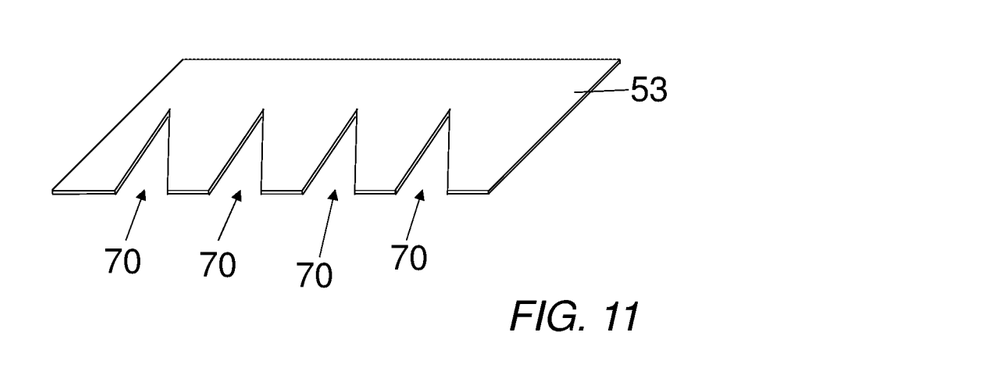
FIG. 11 is a schematic view of an NCF blanket with darts cut out.

In an alternative embodiment the stiffener 40 may include NCF blankets 53 in the run-out region but without any change to the overall shape of the stiffener 40 previously described. Since the NCF blanket 53 is less drapeable than the woven fibre fabric, as shown in FIG. 11 darts 70 may need to be cut in the NCF blanket 53.

When the NCF blanket 53 with the darts 70 is laid upon the mould tool 60 the edges of the blanket 53 either side of the dart 70 are brought together and are slightly overlapping. The presence of the darts 70 provides sufficient formability to the NCF blankets 53 to conform to the shape of the mould 60 in the run-out region 41.

Where NCF blankets 53 are darted then only NCF blankets 53 may be used in the layup of the stiffener 40 and the woven fibre fabric layers 51, 52 may dispensed with. Alternatively, the woven fibre fabric layers 51, 52 may be retained. When NCF blankets with darts 70 are used in the run-out region 41 some of the NCF blankets 53 present in the constant section region 42 may be dropped off in the transition region 50. In other words, the run-out region 41 may have a fewer number of NCF blankets 53 as compared with the constant section region 42. Although the presence of the NCF blankets 53 in the run-out region 41 may be less preferable since the darts 70 may need to be cut out from the blankets 53 prior to layup on the mould tool 60, such an arrangement is still advantageous as no further cutting of the cured stiffener 40 is required after the removal from the mould tool 60.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A composite stiffener for a stiffener reinforced panel, wherein the stiffener has a longitudinal direction and a run-out region which terminates at an end of the stiffener, and a constant section region inboard of the run-out region in the longitudinal direction and having a constant cross section transverse to the longitudinal direction with a crown between adjacent foot portions,
   wherein the run-out region has a changing cross section transverse to the longitudinal direction with a crown between adjacent foot portions and the crown reduces in height towards the end of the stiffener forming a ramp,
   the composite stiffener comprises a plurality of blankets of non-crimp fabric layers, and a transition region between the constant section region and the run-out region, wherein the constant section region has a plurality of blankets of non-crimp fabric layers sandwiched between woven fabric layers, and at least one of the blankets of non-crimp fabric layers is terminated in the transition region.

2. A composite stiffener according to claim 1, wherein the run-out region comprises one or more woven fabric layers.

3. A composite stiffener according to claim 2, wherein the one or more woven fabric layers extends from a top of the ramp to a bottom of the ramp.

4. A stiffener according to claim 1, wherein all of the blankets of non-crimp fabric layers in the constant section region are terminated in the transition region.

5. A stiffener according to claim 1, wherein the run-out region includes the woven fabric layers and no non-crimp fabric blankets.

6. A stiffener according to claim 1, wherein the run-out region has a ramped portion including the ramp, and a substantially planar toe portion between the ramp and the end of the stiffener.

7. A stiffener according to claim 1, wherein each of the blankets of non-crimp fabric layers include a first layer having a 0 degree fibre orientation aligned with the stiffener longitudinal direction and a second layer having a fibre orientation not aligned with the stiffener longitudinal direction.

8. A stiffener according to claim 1, wherein the run-out region includes one or more of the non-crimp fabric blankets.

9. A stiffener according to claim 8, wherein the blanket has a dart cut out and overlaps itself in the run-out region.

10. A stiffener according to claim 1, wherein the constant section region has an omega section.

11. A stiffener according to claim 1, wherein the constant section region has a cross section with continuous layers extending through the crown and the adjacent foot portions.

12. A stiffener according to claim 1, comprising carbon fibre composite material.

13. An aircraft structure including a panel reinforced with a composite stringer having a longitudinal direction and a run-out region which terminates at an end of the stringer, and a constant section region inboard of the run-out region in the longitudinal direction and having a constant cross section transverse to the longitudinal direction with a crown between adjacent foot portions,
   wherein the run-out region has a changing cross section transverse to the longitudinal direction with a crown between adjacent foot portions and the crown reduces in height towards the end of the stringer forming a ramp,
   wherein the stringer comprises a plurality of blankets of non-crimp fabric layers, and a transition region between the constant section region and the run-out region, wherein the constant section region has a plurality of blankets of non-crimp fabric layers sandwiched between woven fabric layers, and at least one of the blankets of non-crimp fabric layers is terminated in the transition region.

14. A method of manufacturing a stiffener, wherein the stiffener has a longitudinal direction with a run-out region at an end of the stiffener, a constant section region inboard of the end in the longitudinal direction and having a cross section with a crown between adjacent foot portions, wherein the run-out region has a changing cross section with a crown between adjacent foot portions and the crown reduces in height towards the end of the stiffener forming a ramp, and a transition region between the constant section region and the run-out region, wherein the method comprises laying up a plurality of blankets of non-crimp fabric layers and a plurality of woven fabric layers as dry fabrics on a mould tool, wherein the plurality of blankets of non-crimp fabric layers are sandwiched between woven fabric layers in the constant section region, cutting at least one of the blankets of non-crimp fabric layers so that the blanket is terminated in the transition region, and co-infusing the dry fabrics with resin followed by co-curing to form the stiffener.

15. A method according to claim 14, further comprising cutting all of the blankets of non-crimp fabric layers so that all of the blankets are terminated in the transition region.

16. A method according to claim 14, wherein the run-out region includes the woven fabric layers and no non-crimp fabric blankets.

17. A method according to claim 14, further comprising laying up the plurality of woven fabric layers on a portion of the mould tool to define the shape of the ramp in the run-out region followed by the co-curing step without an intermediate step of cutting the woven fabric layers laid up on the mould tool.

* * * * *